(12) United States Patent
Maley et al.

(10) Patent No.: US 10,933,395 B1
(45) Date of Patent: Mar. 2, 2021

(54) APPARATUS FOR CATALYTIC REFORMING HYDROCARBONS HAVING FLOW DISTRIBUTOR AND PROCESS FOR REFORMING HYDROCARBONS

(71) Applicant: UOP LLC, Des Plaines, IL (US)

(72) Inventors: John C. Maley, Chicago, IL (US); Ka Leung Lok, Buffalo Grove, IL (US); Jeffrey Grott, Chicago, IL (US); Amresh Kumar Tiwari, Haryana (IN)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/551,499

(22) Filed: Aug. 26, 2019

(51) Int. Cl.
 *B01J 8/02* (2006.01)
 *C10G 45/56* (2006.01)
 *C10G 47/30* (2006.01)
 *C10G 49/16* (2006.01)

(52) U.S. Cl.
 CPC .......... *B01J 8/0278* (2013.01); *B01J 8/0242* (2013.01); *C10G 45/56* (2013.01); *C10G 47/30* (2013.01); *C10G 49/16* (2013.01); *B01J 2208/00938* (2013.01); *C10G 2300/1081* (2013.01); *C10G 2300/1096* (2013.01); *C10G 2300/4056* (2013.01); *C10G 2300/70* (2013.01)

(58) Field of Classification Search
 CPC ................... B01J 8/0278; B01J 8/0242; B01J 2208/00938; C10G 45/56; C10G 47/30; C10G 49/16; C10G 2300/4056; C10G 2300/1081; C10G 2300/1096; C10G 2300/70
 USPC ...................................................... 422/220
 See application file for complete search history.

(56) References Cited

U.S. PATENT DOCUMENTS

| | | | |
|---|---|---|---|
| 2,766,186 | A | 10/1956 | Nadro, Jr. |
| 3,223,616 | A | 12/1965 | Huntington |
| 3,706,536 | A | 12/1972 | Greenwood et al. |
| 4,167,473 | A | 9/1979 | Sikonia |
| 4,567,023 | A | 1/1986 | Greenwood et al. |
| 5,366,704 | A | 11/1994 | Koves et al. |
| 5,580,241 | A | 12/1996 | Koeberle et al. |
| 5,683,573 | A | 11/1997 | Haizmann et al. |

(Continued)

FOREIGN PATENT DOCUMENTS

| | | |
|---|---|---|
| CN | 103073377 A | 5/2013 |
| JP | 11108561 A | 4/1999 |
| RU | 2180346 C2 | 3/2002 |

OTHER PUBLICATIONS

International Preliminary Report on Patentability from PCT application No. PCT/US2017/041722, dated Jan. 29, 2019.

(Continued)

*Primary Examiner* — Huy Tram Nguyen (57) ABSTRACT

A reforming reactor and process of using same in which a flow distributor distributes the process gas circumferentially to the reactive zone. Feed is injected into the reactor into a non-reactive zone. The non-reactive zone has two portions, a first portion receiving the feed, and a second portion receiving a purge gas. The purge gas will flow from the second portion to the first portion to prevent flow of the feed from the first portion to the second portion. The combined gas may be passed to a reaction zone for catalytic reforming. The first portion and the second portion may be separated by a flow distributor having two horizontal portions connected to opposite ends of a vertical portion.

17 Claims, 4 Drawing Sheets

(56) References Cited

U.S. PATENT DOCUMENTS

| | | |
|---|---|---|
| 6,224,838 B1 | 5/2001 | Schulz et al. |
| 6,657,096 B2 | 12/2003 | Boehner et al. |
| 7,531,142 B2 | 5/2009 | Huziwara et al. |
| 7,842,257 B2 | 11/2010 | Fecteau |
| 8,691,155 B2 | 4/2014 | Palmas et al. |
| 8,894,940 B2 | 11/2014 | Krishnamurthy et al. |
| 9,211,517 B2 | 12/2015 | Iddir et al. |
| 2010/0160148 A1 | 6/2010 | Nabozny |
| 2012/0275974 A1 | 11/2012 | Moser et al. |
| 2014/0205506 A1 | 7/2014 | Whittenberger et al. |
| 2014/0294682 A1 | 10/2014 | Vetter et al. |
| 2015/0057480 A1 | 2/2015 | Jeffrey et al. |
| 2018/0029956 A1* | 2/2018 | Lok .................. C10G 35/10 |

OTHER PUBLICATIONS

Written Opinion from PCT application No. PCT/US2017/041722, dated Aug. 24, 2017.
International Search report from corresponding PCT application No. PCT/US2017/041722, dated Sep. 14, 2017.
International Search report from corresponding PCT application No. PCT/US2020/046733, dated Oct. 15, 2020.
Written Opinion from PCT application No. PCT/US2020/046733, dated Oct. 9, 2020.

* cited by examiner

APPARATUS FOR CATALYTIC REFORMING HYDROCARBONS HAVING FLOW DISTRIBUTOR AND PROCESS FOR REFORMING HYDROCARBONS

FIELD OF THE INVENTION

The present invention relates generally to an apparatus and a process for catalytic reforming of hydrocarbons and more particularly to an apparatus and a process for increasing the yield from such an apparatus.

BACKGROUND OF THE INVENTION

The reforming of petroleum raw materials is an important process for producing useful products. For example, reforming processes may be utilized for separating and upgrading hydrocarbons to provide a transportation fuel, such as producing a naphtha feed stream and upgrading the octane value of the naphtha from the production of gasoline. Additionally, hydrocarbons in feed streams from a raw petroleum source may also be utilized the production of desired aromatic chemical precursors for use in the production of plastics, detergents and other products. Accordingly, reforming may be used to produce the desired chemical precursors.

The catalytic reforming process is well known in the art. The principal reactions that take place are the dehydrogenation of naphthenes to aromatics, dehydrocyclization of paraffins, isomerization of paraffins and naphthenes, hydrocracking of paraffins to light hydrocarbons, and formation of coke which is deposited on the catalyst. The formation of coke on the catalyst causes the catalyst to gradually lose activity over time. Accordingly, the catalyst requires regeneration and/or replacement. A continuous transfer of catalyst from and to the reactor is highly desirable.

Typically, in such a reactor, a hydrocarbon feedstock and a hydrogen-rich gas are preheated and charged to a reforming zone containing typically two to five reactors in series. The effluent from the first reactor is withdrawn, heated, and passed to the second reactor. The effluent from the second reactor is withdrawn, reheated and passed to the third reactor. The withdrawal and reheating of the effluent continues until the last reactor and is typically referred to as a radial flow. From the last reactor, the effluent is withdrawn and processed further.

The feedstock/partially converted effluent streams are often passed into the reactor stack via non-reactive sections. Catalyst flows downward through the non-reactive sections in conduits so as to avoid contacting the feedstock/partially converted effluent streams in the non-reactive zones. This empty space is required for meeting the hydraulics requirements in some reactors. In other reactors, the space is required for the reactor inspection, maintenance, and repair. Specifically, the non-reactive zone typically contains a significant amount of piping and mechanical equipment that impinge fluid flow.

The process gas typically comes from an inlet pipe where it is distributed to a radial reactive zone. There is an ongoing desire to provide solutions which effectively and efficiently distribute the process gas through the non-reactive zone to the reactive zone while maintaining appropriate pressure drop of the fluids flowing therein.

SUMMARY OF THE INVENTION

Reactors and processes for reforming hydrocarbons using such reactors have been invented which include a flow distributor that reduces the volume of the non-reactive zone, and does so with a minimal pressure drop increase. According to the various aspects, the flow distributor has two generally horizontal portions connected by at least one generally vertical portion. Such a flow distributor has surprisingly been found to effectively and efficiently evenly distribute the process gas to the circumference of the reactor and reduce unwanted turbulence in the non-reactive section.

As noted above, the piping inside the non-reactive section causes flow impingement, turbulence, and mal-distribution to the circumference of the reactor where conduits are located to facilitate the process gas passing into the reaction zone from the non-reaction zone. The present application discloses configurations for the flow distributor which evenly directs the process gas downward toward the scallops reducing flow impingement and turbulence. Thus, the flow distributor provides more even distribution to the reactive zone by addressing the flow impingement of the catalyst transfer pipes, outlet elbow, and other equipment structures located in the non-reactive zone.

Therefore, the present invention may be characterized, in at least one aspect, as providing a radial flow reactor comprising: a non-reactive zone separated into a first portion and a second portion by a flow distributor, wherein the flow distributor comprises a first horizontal portion, a second horizontal portion, and a first vertical portion connecting the first and second horizontal portions, and wherein the second horizontal portion comprises, when viewed from a top, a sector shape; a reaction zone disposed below the non-reactive zone and separated from the non-reaction zone by a plate; an inlet for a hydrocarbon feed stream in the non-reactive zone; and, an outlet for an effluent stream in the non-reactive zone, the outlet in fluid communication with the reaction zone. The inlet and the outlet may both be disposed within the second portion of the non-reactive zone. The second horizontal portion may comprise a plurality of sections, each having, when viewed from a top, a sector shape. The first horizontal portion may comprise an upper horizontal portion and the second horizontal portion may comprise a lower horizontal portion. The flow distributor may further comprise a second vertical portion, and both the first and second vertical portions may extend between the upper horizontal portion and the lower horizontal portion. The first vertical portion may be connected to the second vertical portion. The flow distributor further may comprise a third vertical portion having a planar profile shape. The first vertical portion may be attached to both the third vertical portion and the second vertical portion. The non-reactive zone may comprise a manway, and the flow distributor may be formed from a plurality of sections each sized to be removed and passed into and out of the reactor through the manway.

In a second aspect, the present invention may broadly be characterized as providing a radial flow reactor comprising: a non-reactive zone separated by a flow distributor into a first portion and a second portion, wherein the flow distributor comprises a first horizontal portion, a first vertical portion, and a second vertical portion, wherein both the first vertical portion and the second portion are connected to the first horizontal portion; a reaction zone disposed below the non-reactive zone, the reaction zone being a radial flow reaction zone; an inlet for a hydrocarbon feed stream in the lower portion of the non-reactive zone; and, an outlet for an effluent stream in the lower portion of the non-reactive zone, the outlet in fluid communication with the reaction zone with a center pipe. An angle, between the first vertical portion and the second vertical portion, when viewed from the top, may be between 60 to 180 degrees. The flow distributor may further comprise a second horizontal portion. The second horizontal portion may comprise a plurality of sections, each having, when viewed from a top, a sector shape. An angle of the first horizontal portion from horizontal may be 15 degrees. An angle of the second horizontal portion from horizontal may be 0 degrees. The non-reactive zone may comprise a manway, and the flow distributor may be formed from a plurality of sections each sized to be removed and passed into and out of the reactor through the manway. The flow distributor may further comprise a second horizontal portion and a third vertical portion, and wherein each of the vertical portions extends between both horizontal portions.

In a third aspect, the present invention, generally, be characterized as providing a process for reforming hydrocarbons in a reactor by: injecting, via an inlet, a hydrocarbon stream into a non-reactive zone of the reactor, wherein the non-reactive zone of the reactor is separated by a flow distributor into a first portion and a second portion, the flow distributor comprising an upper horizontal portion, a lower horizontal portion, and a first vertical portion; passing hydrocarbons, from the hydrocarbon stream, from the first portion of the non-reactive zone to a reaction zone of the reactor; passing catalyst particles to the reaction zone, wherein the catalyst particles are retained in a catalyst section within the reactive zone; passing the hydrocarbons through the catalyst section in a radial direction; and, passing an effluent from the reaction zone, through the first portion of the non-reactive zone of the reactor, to an outlet. The process may further include: injecting a purge gas stream into the second portion of the non-reactive zone of the reactor; and, passing purge gas from the purge gas stream from the second portion of the non-reactive zone to the first portion. The process may further include forming the flow distributor from a plurality of sections each sized to be removed and passed into and out of the reactor through a manway.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

As mentioned above, reactors and processes for reforming hydrocarbons have been invented which include a flow distributor that channels the process gas through the non-reactive zone and does so with a minimal pressure drop increase and minimal turbulence. With these general principles in mind, one or more embodiments of the present invention will be described with the understanding that the following description is not intended to be limiting.

Figure 1:
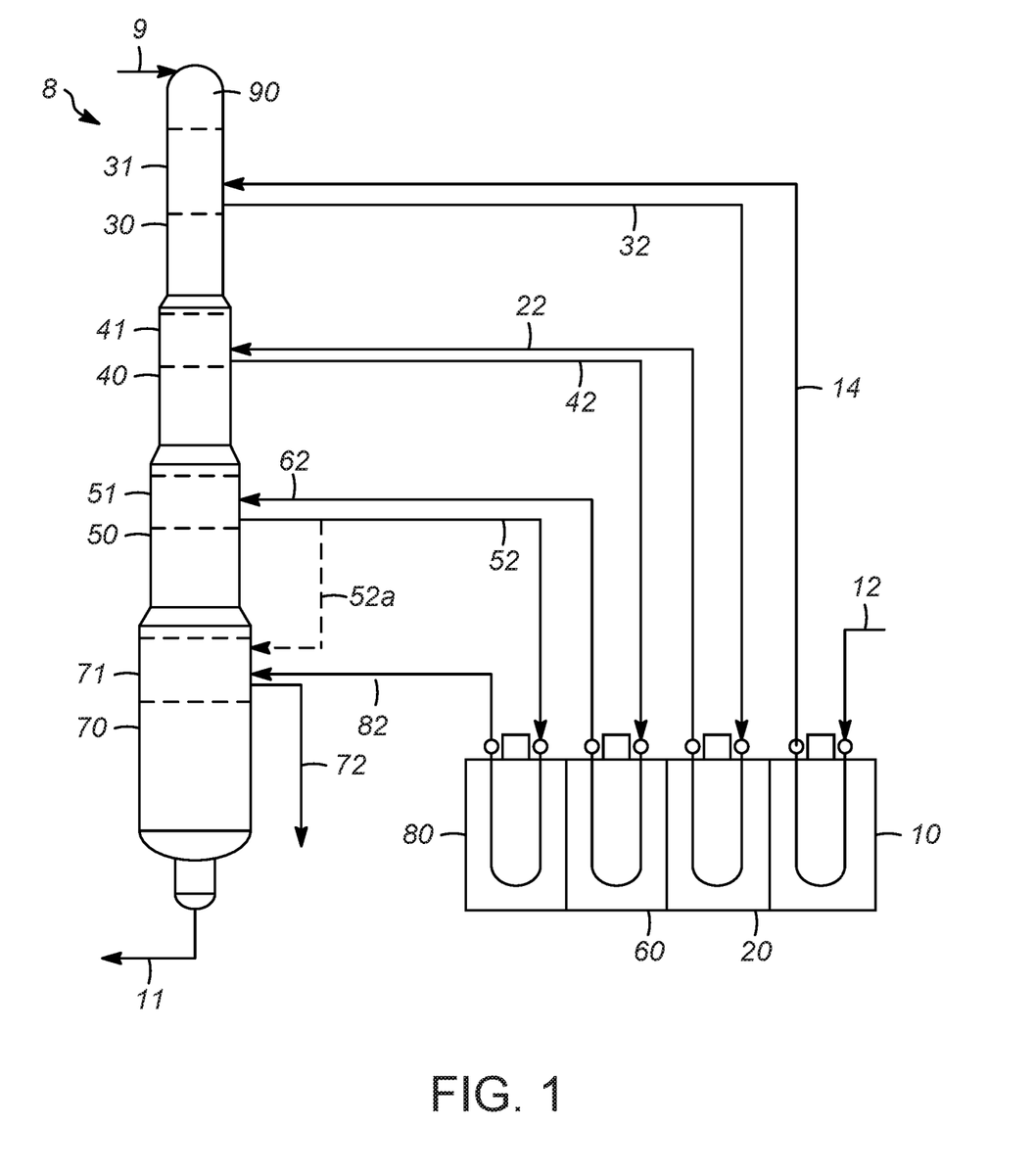
FIG. 1 shows a reactor unit according to one or more aspects of the present invention.

With reference to FIG. 1, the present invention is directed to a reforming reactor 8 for a hydrocarbon feed stream 12. The hydrocarbon feed stream 12 typically comprises naphthenes and paraffins boiling within the gasoline range. The preferred feed streams 12 includes straight-run naphthas, thermally or catalytically cracked naphthas, partially reformed naphthas, raffinates from aromatics extraction and the like. Usually such feed streams 12 have been hydrotreated to remove contaminants, especially sulfur and nitrogen. A gasoline-range feed streams 12 may be a full-range naphtha having an initial boiling point from about 40° to about 70° C. and an end boiling point within the range from about 160° to about 220° C., or may be a selected fraction thereof. The feed stream 12 may be heated in a charge heater 10 and passed to the reforming reactor 8 along with a catalyst in a catalyst transfer line 9.

Operating conditions used for reforming processes usually include an absolute pressure selected within the range from about 100 to about 7,000 kPa (about 14.5 to about 1015 psi), or from about 350 to about 4,250 kPa (about 51 to about 616 psi). It is believed that particularly good results may be obtained at low pressure, namely an absolute pressure from about 350 to about 2,500 kPa (about 51 to about 363 psi). Reforming conditions include a temperature in the range from about 315° to about 600° C. (about 599° to about 1112° F.), or from about 425° to about 565° C. (about 797° to about 1049° F.). As is well known to those skilled in the reforming art, the initial selection of the temperature within this broad range is made primarily as a function of the desired octane of the product reformate, considering the characteristics of the feed stream and of the catalyst.

The reforming conditions in the present invention also typically include sufficient hydrogen to provide an amount from about 1 to about 20 moles of hydrogen per mole of hydrocarbon feed entering the reforming zone, with enhanced results being obtained when about 2 to about 10 moles of hydrogen are used per mole of hydrocarbon feed likewise, the liquid hourly space velocity (LHSV) used in reforming is selected from the range from about 0.1 to about 10 $hr^{-1}$, or from about 1 to about 5 $hr^{-1}$.

A multi-functional catalyst composite, which contains a metallic hydrogenation-dehydrogenation component on a porous inorganic oxide support providing acid sites for cracking and isomerization, is usually employed in catalytic reforming. Most reforming catalyst is in the form of spheres or cylinders having an average particle diameter or average cross-sectional diameter from about 1.59 to about 4.76 mm (1/16 inch to about 3/16 inch). Catalyst composites comprising platinum on highly purified alumina or on zeolitic supports are particularly well known in the art. Metallic modifiers that improve product yields or catalyst life, such as rhenium, iridium, tin, and germanium, also may be incorporated into the catalyst.

As shown in FIG. 1, the reforming reactor 8 contains a series of four reaction zones 30, 40, 50, 70 arranged vertically in reforming reactor 8. This is merely one configuration and is not intended to be limiting, other configurations may be utilized for practicing the present invention. Catalyst particles enter the top of the reforming reactor 8 through the catalyst transfer line 9 and pass through the series reaction zones 30, 40, 50, 70 under gravity flow. After passing through all of the reaction zones 30, 40, 50, 70, the catalyst particles are withdrawn from the bottom of the reforming reactor 8 by one or more catalyst withdrawal lines 11.

Catalyst withdrawn through the catalyst withdrawal lines 11 may be regenerated by the oxidation and removal of coke deposits in a regeneration zone (not shown). After regeneration, catalyst particles may be again returned to the process and the reforming reactor 8 by the catalyst transfer line 9.

After the feed stream 12 is heated in charge heater 10, the heated feed 14 can pass to the first reaction zone 30. Since the reforming reaction is endothermic, heaters are used to add heat to drive the catalyst reaction forward towards the desired product. Therefore, a first reactor effluent 32 is passed to a first heater 20 to generate a heated second reactor feed 22. A second reactor effluent 42 is passed to another heater 60 to generate a heated third reactor feed 62. A third reactor effluent 52 is passed to another heater 80 to generate a fourth reactor feed 82. A fourth reactor effluent 72 comprises a reformate product which can be recovered from the reactor 8 and processed further as is known. In the fixed bed and continuous catalyst regeneration reforming processes, the heaters are commonly used to heat up the feed streams 14, 22, 62, 82 to an elevated temperature and catalyzed by metal-based catalyst in the catalyst reactive zone in order to meet the product quality specifications such as product octane, aromatics product yield, and hydrogen product yield.

As shown in the FIG. 1, the introduction of heated feed streams 14, 22, 62, 82 and withdrawal of effluent streams 32, 42, 52, 72 occurs in non-reactive zones 31, 41, 51, 71. As can be seen, some of the non-reactive zones 31, 41, 51, 71 are spaced between consecutive reaction zone 30, 40, 50, 70, while the first non-reactive zone 31 is disposed between the first reaction zone 30 and a catalyst introduction zone 90. The catalyst introduction zone 90 may comprise a reduction zone. In a reduction zone, the oxidized catalyst from the catalyst regeneration section (not shown) is reduced to a reduced state for optimal performance. Alternatively, the catalyst introduction zone 90 may comprise a catalyst surge zone which provides catalyst surging capability.

The non-reactive zones 31, 41, 51, 71 typically function as a crude distribution zone in which catalyst is substantially absent. In these non-reactive zones 31, 41, 51, 71, there are significant piping and fittings that cause flow imbalance, turbulence, and impingement. Additionally, the upper section of the non-reactive zone typically has a large eddy current where process gas is accumulating turbulence. This unwanted turbulence causes mal-distribution to the reactive zone, higher pressure drop, and, as a result, reaction yield and conversion is compromised.

Typical fixed bed reforming process or continuous regeneration process have an operating temperature near or above 480° C. (950° F.). This phenomenon of non-catalyzed molecular weight reduction transformation is well understood in fixed bed reforming process and continuous catalyst regeneration processes. The non-catalyzed transformation of molecule weight reduction prior to entering the reaction zone 30, 40, 50, 70 results in lower $C_5+$ hydrocarbon yield, lower product aromatics yield, and lower hydrogen yield. The severity and amount of hydrocarbons undergoing this undesired non-catalyzed molecular weight reduction transformation depend on numbers of factors including operating temperature, boiling point temperature of the hydrocarbon species, types of the hydrocarbon species, and duration of resident time the hydrocarbons spending at the elevated temperature environment prior to entering the reaction zone 30, 40, 50, 70.

The size or volume of the non-reactive zones 31, 41, 51, 71 is typically governed by both personnel access requirement for performing maintenance activities and installation of the reactor internals and actual space that the internals need. Additionally, as discussed below, the size of the non-reactive zones 31, 41, 51, 71 is also governed by system hydraulics requirement for proper catalyst flow transportation between an upper catalyst containing vessel such as catalyst introduction zone 90, or a reaction zone 30, 40, 50, and another reaction zone 30, 40, 50, 70. These requirements generally govern the dimensional size for the non-reactive zones 31, 41, 51, 71 and the size is often greater than the required size or volume for proper feed distribution to achieve even flow. With the internal equipment in this section, there is a significant amount of flow impingement that causes flow imbalance. Typically, the volume of the non-reactive zones 31, 41, 51, 71 determines the residence time of the heated feed streams 14, 22, 62, 82 in the non-reactive zones 31, 41, 51, 71.

The present invention is directed at efficiently and effectively distributing the process gas evenly to the reaction zones 30, 40, 50, 70 through the non-reactive zones 31, 41, 51, 71 that the feed (or intermediate effluent) occupies, and decreasing the flow imbalance to the reaction zones 30, 40, 50, 70. By reducing the non-reactive volume that the process gas is in contact with, turbulence is reduced and circumferential flow distribution is improved.

Figure 2:
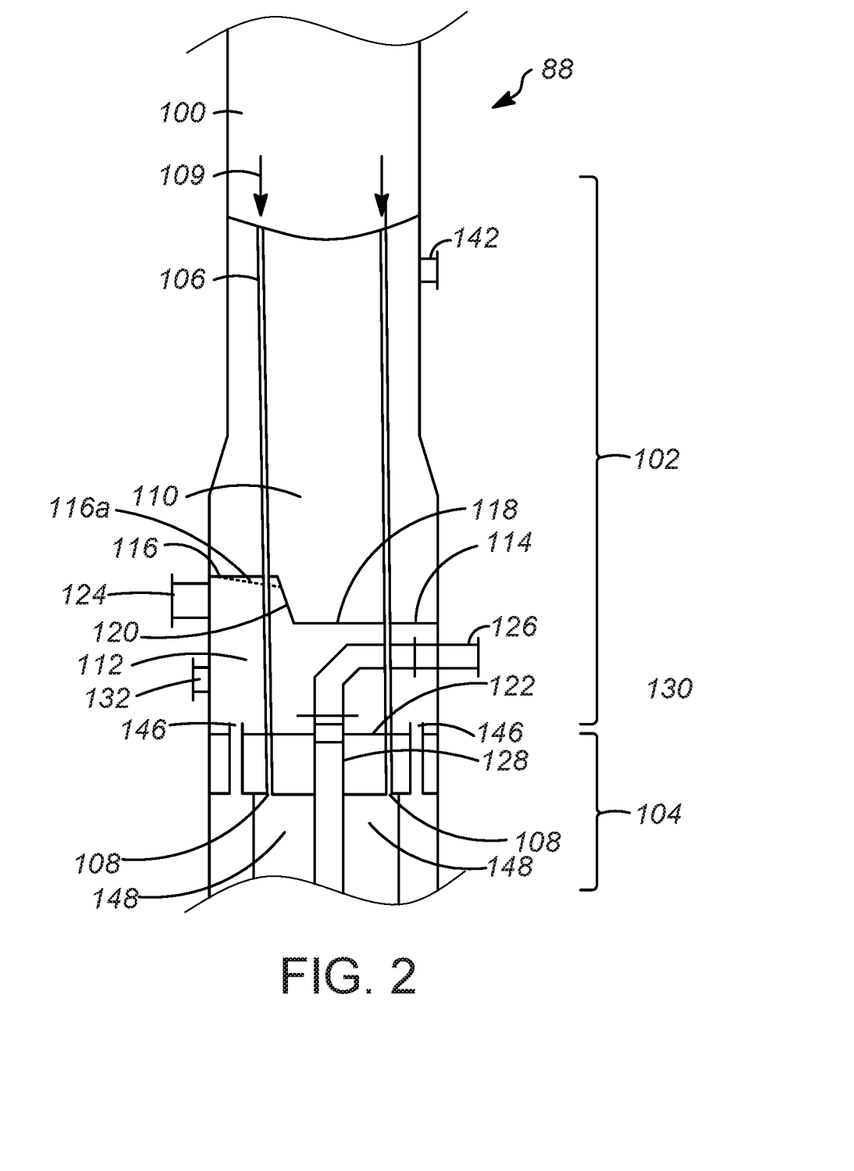
FIG. 2 is a side cutaway view of a portion of a reactor unit according to one or more aspects of the present invention.

Turning to FIG. 2, a reactor unit 88 is shown which includes a catalyst source zone 100, a non-reactive zone 102 and a reaction zone 104. The catalyst source zone 100 may comprise the catalyst introduction zone 90 (from FIG. 1) or a reaction zone 30, 40, 50 (from FIG. 1) depending on the number of reaction zones and the type of reactor unit 88. Conduits 106 transfer catalyst 109 from the catalyst source zone 100, through the non-reactive zone 102, and to the reaction zone 104 so that the catalyst 109 is isolated from any reactants within the non-reactive zone 102. Outlets 108 for the conduits 106 are disposed within the reaction zone 104.

According to the present disclosure, the non-reactive zone 102 is separated into two portions 110, 112 by a flow distributor 114, which may be a vane, plate, baffle, or other such flow directing structures. The first portion 110 of the non-reactive zone 102 is an upper portion, and the second portion 112 of the non-reactive zone 102 is a lower portion. The flow distributor 114 includes a first horizontal portion 116, a second horizontal portion 118, and at least a first vertical portion 120. By "horizontal" it is meant that the horizontal portions 116, 118 extend in a direction that forms an angle between 0 and 35 degrees from the horizon. For example, the first horizontal portion 116, may be angled at approximately 15 degrees as depicted by the dashed line 116a. Similarly, by "vertical" it is meant that any vertical portion, like the first vertical portion 120 extend in a direction that forms an angle between 0 and 30 degrees from a vertical line such as a longitudinal axis of the reactor unit 88. Additionally, the length of the upper horizontal portion from the reactor shell towards the center of the reactor unit 88 may be between a radius (from the shell to the center) to 0.3 of a radius.

The reaction zone 104 is separated from the non-reactive zone 102 by a plate 122. The reactor unit 88 also includes an inlet 124 for a hydrocarbon feed stream and an outlet 126 for an effluent stream. The outlet 126 is in communication with the reaction zone 104 via, for example, a centerpipe 128. Both the inlet 124 and the outlet 126 are located in the non-reactive zone 102, and more specifically in the second portion 112 of the non-reactive zone 102.

Figure 3:
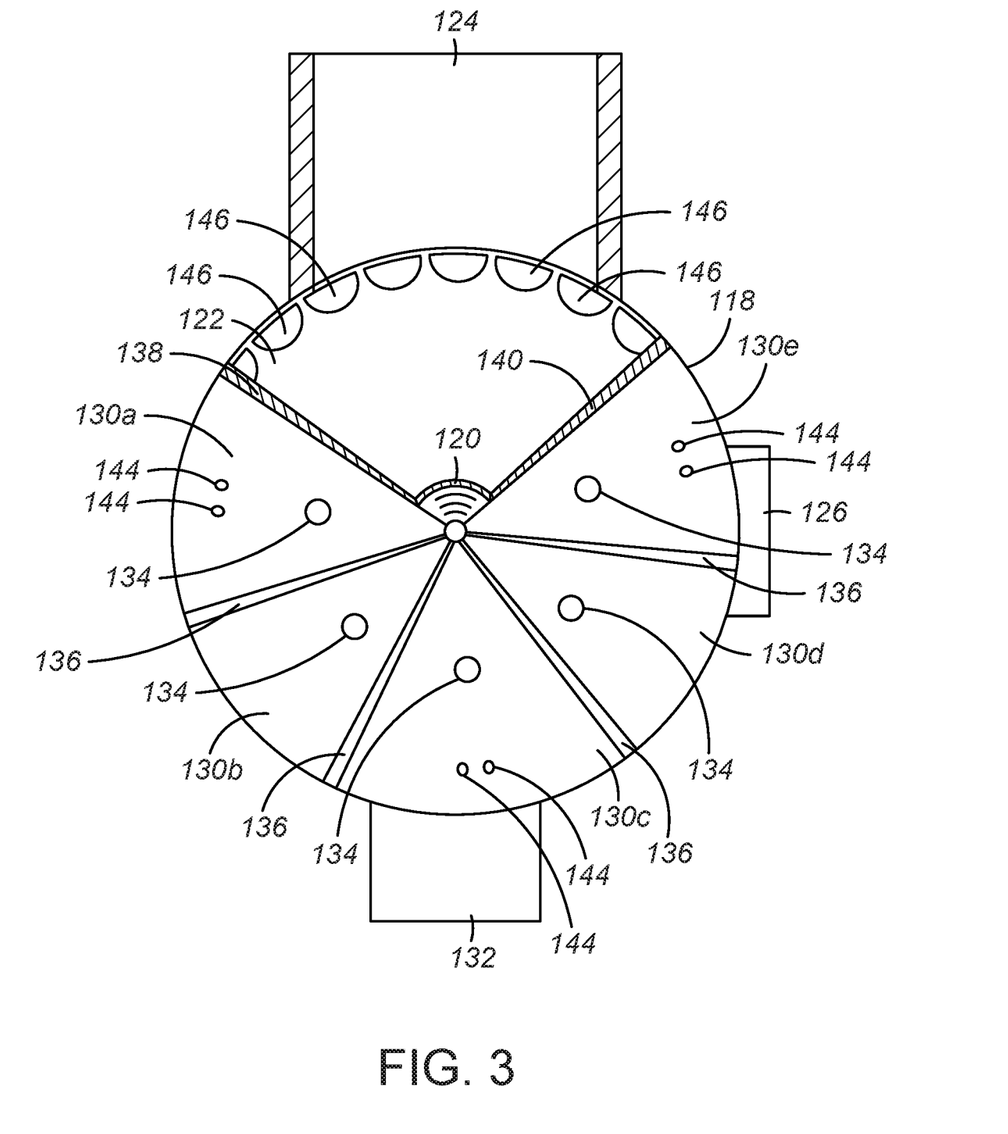
FIG. 3 is a top cutaway view of a portion of a reactor unit according to one or more aspects of the present invention; and, FIG. 4 is a side perspective side cutaway view of a portion of a reactor unit according to one or more aspects of the present invention.
Figure 4:
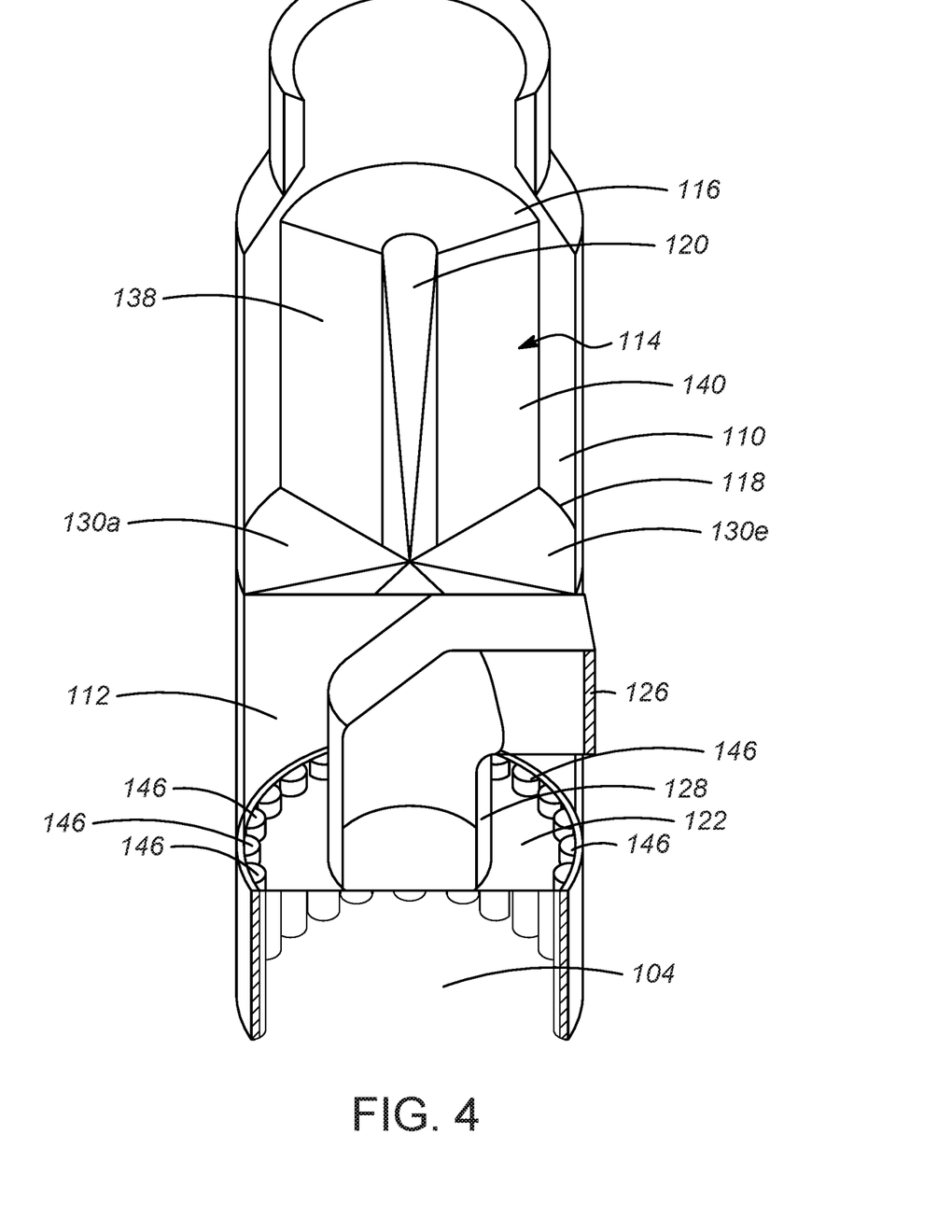

Turning to FIGS. 3 and 4, the second horizontal portion 118, when viewed from a top, has a sector shape. The angle between the two ends of the sector shape of the second horizontal portion 118 may be between 60 to 180 degrees, between 80 and 120 degrees, or approximately 100 degrees. The second horizontal portion 118 comprises a plurality of sections 130a, 130b, 130c, 130d, 130e, each having, when viewed from a top, a sector shape. The use of the sections 130a, 130b, 130c, 130d, 130e allow for the flow distributor 114 to be installed in the reactor though a manway 132. Typical manways 132 are approximately 0.6 meters (24 inches) in diameter, however, the size of the manway 132 may range between 0.46 to 1.22 meters (18 to 48 inches). Installing/removing the sections 130a, 130b, 130c, 130d, 130e of the flow distributor 114 from the manway 132 simplifies the installation process since other reactor internals do not need to be disturbed, making it easy to manage during a turnaround. Additionally, the sections 130a, 130b, 130c, 130d, 130e function as a manway themselves such that a person could remove one of the sections 130a, 130b, 130c, 130d, 130e to pass from the upper section 110 of the non-reactive zone 102 to the lower portion 112 of the non-reactive zone 102 without removing the entirety of the flow distributor 114 and without requiring removal of other structures, like the catalyst conduits 106.

The flow distributor 114 may be mounted to support lugs (not shown) that are welded to the wall of the reactor unit 88. Additionally, support bars (not shown) may extend from the centerpipe 128, and specifically from the elbow of the centerpipe 128. Other mounting structures may be used.

As shown in FIG. 3, there are holes 134 in the sections 130a, 130b, 130c, 130d, 130e to allow the catalyst transfer pipes 106 to pass through the flow distributor 114. Joints 136 between the sections 130a, 130b, 130c, 130d, 130e reinforce the mechanical integrity of the flow distributor, as well as to seal off the second portion 112 of the non-reactive zone 102 from the first portion 110. The joint 136 connections may utilize either wedge pin, bolted, or welded connections. The flow distributor 114 allows space for personnel access during turnaround activities and may be utilized to support personnel entry for inspection, maintenance and installation activities during turnarounds.

The first vertical flow distributor portion 120 is connected to a second vertical flow distributor portion 138 and a third vertical flow distributor portion 140 also extend between the upper and lower horizontal flow distributor portions 116, 118. The second and third vertical flow distributor portions 138, 140 each have a planar profile shape when viewed from the top along their respective longitudinal axes. Additionally, both of the second and third vertical flow distributor portions 138, 140 are connected to the first vertical flow distributor portion 120.

Returning to FIG. 2, purge gas may be introduced via a purge gas inlet 142 into the first portion 110 of the non-reactive zone 102. The purge gas may be <1% of the total inlet process flow to the reactor unit 88 and is utilized to sweeps the first portion 110 of the non-reactive zone 102 and prevent process gas from entering the upper portion 110 of the non-reactive zone 102 above the flow distributor 114. The purge gas exits the first portion 110 of the non-reactive zone 102 and mixes with the rest of the inlet gas flow, for example, via small vent hole(s) 144 in the flow distributor 114 (FIG. 3), and specifically in the sections 130a, 130b, 130c, 130d, 130e, enlarged holes 134 (FIG. 3) in the sections 130a, 130b, 130c, 130d, 130e where the catalyst transfer pipes 106 will pass through, and/or specified gaps designed into the joints 136 (FIG. 3) between sections 130a, 130b, 130c, 130d, 130e. It may be desirable to utilize a small mechanical fitting (such as a fender washer) around the transfer pipes 106 to reduce the amount of purge gas needed while also providing mechanical flexibility during thermal expansion of the reactor unit 88.

The purge gas comprises molecular weight stable gas at the operating temperature of the reactor unit 88 and can be, for example, inert (non-reactive) gas such halide, nitrogen, or hydrogen rich gas containing more than 70% by volume of hydrogen, light hydrocarbon species ($C_5$– hydrocarbons) and less than 5% by volume of $C_6$ hydrocarbons, preferably containing 80% or more by volume of hydrogen and less than 1% by volume of $C_6$ hydrocarbons. As shown in FIG. 1, it is contemplated that the purge gas for the non-reactive zone may comprise a portion of the effluent 32, 42, 52, 72 from a reaction zone 30, 40, 50, 70, preferably an upstream reaction zone. For example, with reference to FIG. 1, a portion of the effluent 52 form the third reaction zone 50 in line 52a may be used as the purge gas in the non-reactive zone 71 associated with the fourth reaction zone 70. Use of a portion of the effluent 32, 42, 52, 72 will minimize the need or use of an external purge gas, which may be especially beneficial in applications in which the invention is practiced by revamping an existing reformer.

To prevent the feed from diffusing to and occupying the first portion 110 of the non-reactive zone 102, the first portion 110 of the non-reactive zone 102 is preferably kept at a higher pressure than the second portion 104 of the non-reactive zone 102 by a differential pressure controller and control valve (not shown). The differential pressure control valve injects sufficient amounts of purge gas rate on a continuous basis to maintain a positive differential pressure between the first portion 110 and the second portion 104 that is preferably between 1.24 kPag to 68.9 kPag (about 0.18 to about 10 psi).

The combined gas (feed and purge) may pass to the reaction zone 104 through conduits 146, such as scallops. See, e.g., U.S. Pat. Nos. 5,366,704, 6,224,838, and 7,842, 257. The conduits 146 typically include a perforate plate or screen and distribute the feed axially to the reaction zone 104. Preferably, there is a positive pressure differential between the second portion 112 of the non-reactive zone 102 and the conduits 146 that is between about 0.2 to about 24 kPag (about 0.03 to about 3.5 psi). This pressure differential will allow the second portion 112 of the non-reactive zone 102 to function as a distribution chamber for the feed entering through the feed inlet nozzle 124.

Thus, in operation, the reactor section 88 may be used in a process for reforming hydrocarbons. In an exemplary process, a hydrocarbon stream (either feed or partially reformed effluent) is injected into the non-reactive zone 102 via the feed inlet nozzle 124. The non-reactive zone 102 is separated into the upper portion 110 and the lower portion 112 by the flow distributor 114. The hydrocarbons from the feed are passed from the lower portion 112 of the non-reactive zone 102 to the reaction zone 104 of the reactor portion 88 through conduits 146. Catalyst particles 109 are passed into the reaction zone 104 via the catalyst transfer pipes 106. The catalyst particles discharged from the outlets 108 for the conduits 106 are retained in a catalyst section 148 within the reaction zone 104. The hydrocarbons pass into and through the catalyst section 148 in a radial direction. In the depicted embodiment, this is inwardly, but it also contemplated that the flow be reversed. An effluent from the reaction zone 104 may be recovered from the outlet nozzle 112, which is in communication with the reaction zone 104 via the centerpipe 128. The first portion 110 of the non-reactive zone 102 includes an inlet 142 for a purge gas. The purge gas will flow from the first portion 110 of the non-reactive zone 102 to the second portion 112 via, as noted above, apertures 144, oversized conduit apertures 134, joints 136, a combination thereof, or via another means.

The flow distributor 114 comprises two horizontal portions 116, 118 connected by at least one vertical portion 120, 138, 140. As explained above, such a flow distributor 114 lowers the volume of the second portion 112 of the non-reactive zone 102, while maintaining or providing suitable fluid flow from the second portion 112 of the non-reactive zone 102 to the reaction zone 104 through the conduits 146. Indeed, such a flow distributor 114 provides the second portion 112 of the non-reactive zone 102 with a varying height. Additionally, the shape of the second portion 112 of the non-reactive zone 102 is not uniform. It was surprisingly found that such a non-uniform shaped portion would allow for suitable distribution of the feed.

According to calculations, a flow distributor with a flat upper horizontal portion that is 1000 mm long, and has 100 degree angle between the second and third vertical flow distributor portions will reduce the volume of the non-reactive zone by 51.1% with only a 0.2 pressure drop. For the same design, but with an angle of −10 degrees for the upper horizontal portion, the volume was reduced by 51.0%, with a 0.18 pressure drop.

It should be appreciated and understood by those of ordinary skill in the art that various other components such as valves, pumps, compressors, instrumentation, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a radial flow reactor comprising a non-reactive zone separated into a first portion and a second portion by a flow distributor, wherein the flow distributor comprises a first horizontal portion, a second horizontal portion, and a first vertical portion connecting the first and second horizontal portions, and wherein the second horizontal portion comprises, when viewed from a top, a sector shape; a reaction zone disposed below the non-reactive zone and separated from the non-reactive zone by a plate; an inlet for a hydrocarbon feed stream in the non-reactive zone; and, an outlet for an effluent stream in the non-reactive zone, the outlet in fluid communication with the reaction zone. An embodiment of the invention is one, any or all of prior embodiments in this paragraph up through the first embodiment in this paragraph, wherein the inlet and the outlet are both disposed within the second portion of the non-reactive zone. An embodiment of the invention is one, any or all of prior embodiments in this paragraph up through the first embodiment in this paragraph, wherein the second horizontal portion comprises a plurality of sections, each having, when viewed from a top, a sector shape An embodiment of the invention is one, any or all of prior embodiments in this paragraph up through the first embodiment in this paragraph, wherein the first horizontal portion comprises an upper horizontal portion and the second horizontal portion comprises a lower horizontal portion. An embodiment of the invention is one, any or all of prior embodiments in this paragraph up through the first embodiment in this paragraph, wherein the flow distributor further comprises a second vertical portion, and wherein both the first and second vertical portions extend between the upper horizontal portion and the lower horizontal portion. An embodiment of the invention is one, any or all of prior embodiments in this paragraph up through the first embodiment in this paragraph, wherein the first vertical portion is connected to the second vertical portion. An embodiment of the invention is one, any or all of prior embodiments in this paragraph up through the first embodiment in this paragraph, wherein the flow distributor further comprises a third vertical portion having a planar profile shape. An embodiment of the invention is one, any or all of prior embodiments in this paragraph up through the first embodiment in this paragraph, wherein the first vertical portion is attached to both the third vertical portion and the second vertical portion. An embodiment of the invention is one, any or all of prior embodiments in this paragraph up through the first embodiment in this paragraph, wherein the non-reactive zone comprises a manway, and wherein the flow distributor is formed from a plurality of sections each sized to be removed and passed into and out of the reactor through the manway.

A second embodiment of the invention is a radial flow reactor comprising a non-reactive zone separated by a flow distributor into a first portion and a second portion, wherein the flow distributor comprises a first horizontal portion, a first vertical portion, and a second vertical portion, wherein both the first vertical portion and the second portion are connected to the first horizontal portion; a reaction zone disposed below the non-reactive zone, the reaction zone being a radial flow reaction zone; an inlet for a hydrocarbon feed stream in the lower portion of the non-reactive zone; and, an outlet for an effluent stream in the lower portion of the non-reactive zone, the outlet in fluid communication with the reaction zone with a center pipe. An embodiment of the invention is one, any or all of prior embodiments in this paragraph up through the second embodiment in this paragraph wherein an angle, between the first vertical portion and the second vertical portion, when viewed from the top, is between 60 to 180 degrees. An embodiment of the invention is one, any or all of prior embodiments in this paragraph up through the second embodiment in this paragraph, wherein the flow distributor further comprises a second horizontal portion. An embodiment of the invention is one, any or all of prior embodiments in this paragraph up through the second embodiment in this paragraph, wherein the second horizontal portion comprises a plurality of sections, each having, when viewed from a top, a sector shape. An embodiment of the invention is one, any or all of prior embodiments in this paragraph up through the second embodiment in this paragraph, wherein an angle of the first horizontal portion from horizontal is 15 degrees. An embodiment of the invention is one, any or all of prior embodiments in this paragraph up through the second embodiment in this paragraph, wherein an angle of the second horizontal portion from horizontal is 0 degrees. An embodiment of the invention is one, any or all of prior embodiments in this paragraph up through the second embodiment in this paragraph, wherein the non-reactive zone comprises a manway, and wherein the flow distributor is formed from a plurality of sections each sized to be removed and passed into and out of the reactor through the manway. An embodiment of the invention is one, any or all of prior embodiments in this paragraph up through the second embodiment in this paragraph, wherein the flow distributor further comprises a second horizontal portion and a third vertical portion, and wherein each of the vertical portions extends between both horizontal portions.

A third embodiment of the invention is a process for reforming hydrocarbons in a reactor, the process comprising injecting, via an inlet, a hydrocarbon stream into a non-reactive zone of the reactor, wherein the non-reactive zone of the reactor is separated by a flow distributor into a first portion and a second portion, the flow distributor comprising an upper horizontal portion, a lower horizontal portion, and a first vertical portion; passing hydrocarbons, from the hydrocarbon stream, from the first portion of the non-reactive zone to a reaction zone of the reactor; passing catalyst particles to the reaction zone, wherein the catalyst particles are retained in a catalyst section within the reactive zone; passing the hydrocarbons through the catalyst section in a radial direction; and, passing an effluent from the reaction zone, through the first portion of the non-reactive zone of the reactor, to an outlet. An embodiment of the invention is one, any or all of prior embodiments in this paragraph up through the third embodiment in this paragraph, further comprising injecting a purge gas stream into the second portion of the non-reactive zone of the reactor; and, passing purge gas from the purge gas stream from the second portion of the non-reactive zone to the first portion. An embodiment of the invention is one, any or all of prior embodiments in this paragraph up through the third embodiment in this paragraph, further comprising forming the flow distributor from a plurality of sections each sized to be removed and passed into and out of the reactor through a manway.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A radial flow reactor comprising:
    a non-reactive zone separated into a first portion and a second portion by a flow distributor, wherein the flow distributor comprises a first horizontal portion, a second horizontal portion, and a first vertical portion connecting the first and second horizontal portions, and wherein the second horizontal portion comprises, when viewed from a top, a sector shape;
    a reaction zone disposed below the non-reactive zone and separated from the non-reactive zone by a plate;
    an inlet for a hydrocarbon feed stream in the non-reactive zone; and,
    an outlet for an effluent stream in the non-reactive zone, the outlet in fluid communication with the reaction zone.

2. The radial flow reactor of claim 1, wherein the inlet and the outlet are both disposed within the second portion of the non-reactive zone.

3. The radial flow reactor of claim 1, wherein the second horizontal portion comprises a plurality of sections, each having, when viewed from a top, a sector shape.

4. The radial flow reactor of claim 1, wherein the first horizontal portion comprises an upper horizontal portion and the second horizontal portion comprises a lower horizontal portion.

5. The radial flow reactor of claim 4, wherein the flow distributor further comprises a second vertical portion, and wherein both the first and second vertical portions extend between the upper horizontal portion and the lower horizontal portion.

6. The radial flow reactor of claim 5, wherein the first vertical portion is connected to the second vertical portion.

7. The radial flow reactor of claim 6, wherein the flow distributor further comprises a third vertical portion having a planar profile shape.

8. The radial flow reactor of claim 7, wherein the first vertical portion is attached to both the third vertical portion and the second vertical portion.

9. The radial flow reactor of claim 1, wherein the non-reactive zone comprises a manway, and wherein the flow distributor is formed from a plurality of sections each sized to be removed and passed into and out of the reactor through the manway.

10. A radial flow reactor comprising:
a non-reactive zone separated by a flow distributor into a first portion and a second portion, wherein the flow distributor comprises a first horizontal portion, a first vertical portion, and a second vertical portion, wherein both the first vertical portion and the second portion are connected to the first horizontal portion;
a reaction zone disposed below the non-reactive zone, the reaction zone being a radial flow reaction zone;
an inlet for a hydrocarbon feed stream in the lower portion of the non-reactive zone; and,
an outlet for an effluent stream in the lower portion of the non-reactive zone, the outlet in fluid communication with the reaction zone with a center pipe.

11. The radial flow reactor of claim 10 wherein an angle, between the first vertical portion and the second vertical portion, when viewed from the top, is between 60 to 180 degrees.

12. The radial flow reactor of claim 10, wherein the flow distributor further comprises a second horizontal portion.

13. The radial flow reactor of claim 12, wherein the second horizontal portion comprises a plurality of sections, each having, when viewed from a top, a sector shape.

14. The radial flow reactor of claim 13, wherein an angle of the first horizontal portion from horizontal is 15 degrees.

15. The radial flow reactor of claim 14, wherein an angle of the second horizontal portion from horizontal is 0 degrees.

16. The radial flow reactor of claim 10, wherein the non-reactive zone comprises a manway, and
wherein the flow distributor is formed from a plurality of sections each sized to be removed and passed into and out of the reactor through the manway.

17. The radial flow reactor of claim 10, wherein the flow distributor further comprises a second horizontal portion and a third vertical portion, and wherein each of the vertical portions extends between both horizontal portions.

* * * * *